United States Patent
Coulot

(10) Patent No.: US 11,321,599 B2
(45) Date of Patent: May 3, 2022

(54) DUAL FREQUENCY HF-UHF IDENTIFICATION INTEGRATED CIRCUIT

(71) Applicant: EM MICROELECTRONIC-MARIN SA, Marin (CH)

(72) Inventor: Thomas Coulot, Vercel-Villedieu-le-Camp (FR)

(73) Assignee: EM MICROELECTRONIC-MARIN SA, Marin (CH)

( * ) Notice: Subject to any disclaimer, the term of this patent is extended or adjusted under 35 U.S.C. 154(b) by 0 days.

(21) Appl. No.: 16/834,223

(22) Filed: Mar. 30, 2020

(65) Prior Publication Data

US 2020/0349407 A1 Nov. 5, 2020

(30) Foreign Application Priority Data

Apr. 30, 2019 (EP) ..................................... 19171983

(51) Int. Cl.
| | |
|---|---|
| *G06K 19/06* | (2006.01) |
| *G06K 19/07* | (2006.01) |
| *G05F 1/46* | (2006.01) |
| *H01Q 1/22* | (2006.01) |

(52) U.S. Cl.
CPC .......... *G06K 19/0701* (2013.01); *G05F 1/46* (2013.01); *G06K 19/0723* (2013.01); *H01Q 1/2225* (2013.01)

(58) Field of Classification Search
CPC ............. G01L 27/1285; G01L 27/1288; G01L 27/1292; G01L 29/86; Y10S 25/91
USPC ................................ 235/492, 462.46, 472.02
See application file for complete search history.

(56) References Cited

U.S. PATENT DOCUMENTS

| | | | |
|---|---|---|---|
| 8,085,068 B1 * | 12/2011 | Subramanian ....... | H03K 23/667 327/115 |
| 2013/0146669 A1 | 6/2013 | Almond et al. | |
| 2015/0090798 A1 * | 4/2015 | Pachler .................. | B42D 25/23 235/492 |

(Continued)

FOREIGN PATENT DOCUMENTS

| | | |
|---|---|---|
| CN | 206 193 873 U | 5/2017 |
| EP | 3 076 341 A1 | 10/2016 |

(Continued)

OTHER PUBLICATIONS

European Search Report for corresponding EP 19 17 1983 dated Aug. 22, 2019.

(Continued)

*Primary Examiner* — Daniel St Cyr
(74) *Attorney, Agent, or Firm* — Sughrue Mion, PLLC

(57) ABSTRACT

A dual frequency HF-UHF RFID integrated circuit including a power supply. The power supply includes: an HF branch including an HF rectifier and a linear voltage regulator, wherein the HF rectifier is configured to be connected to a resonance circuit formed by a HF antenna-coil and a resonance capacitor and wherein the HF rectifier is connected to the linear voltage regulator; a UHF branch including a UHF rectifier and a shunt voltage regulator, wherein the UHF rectifier has a charge pump and is configured to be connected to a UHF antenna and wherein the UHF rectifier is connected to the shunt voltage regulator; and a supply line, wherein the linear voltage regulator and the shunt voltage regulator are both connected to the supply line of the power supply.

16 Claims, 1 Drawing Sheet

(56) References Cited

U.S. PATENT DOCUMENTS

2016/0268850 A1* 9/2016 Kolman .......... G06K 19/07749

FOREIGN PATENT DOCUMENTS

| ER | 3 067 835 A1 | 9/2016 |
| JP | 2005-312285 A | 11/2005 |
| JP | 2016-167261 A | 9/2016 |

OTHER PUBLICATIONS

Notice of the reason for Refusal dated Jun. 22, 2021 from the Japanese Patent Office in JP Application No. 2020-068135.

* cited by examiner

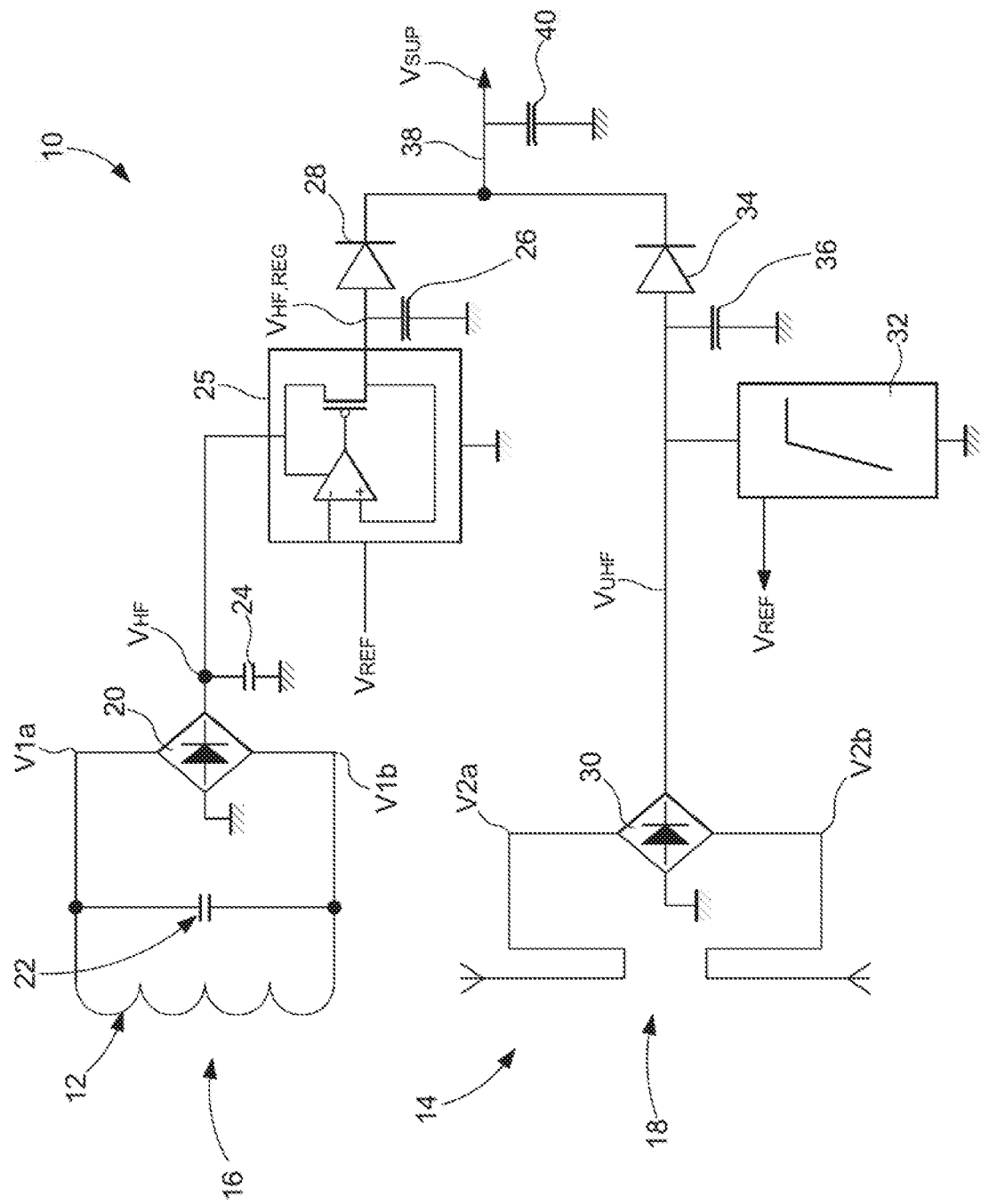

DUAL FREQUENCY HF-UHF IDENTIFICATION INTEGRATED CIRCUIT

CROSS REFERENCE TO RELATED APPLICATIONS

This application claims priority to European Patent Application No. 19171983.0 filed Apr. 30, 2019, the entire contents of which are incorporated herein by reference.

FIELD OF THE INVENTION

The present invention relates to dual frequency high frequency-ultra high frequency (HF-UHF) identification devices and more particularly to dual frequency HF-UHF radio frequency identification (RFID) integrated circuits.

BACKGROUND OF THE INVENTION

Several dual frequency RFID integrated circuits have been proposed in the past. In particular, for passive devices, a power supply is provided for supplying power to the integrated circuit. The power supply generally comprises at least a power generator. In the case where the power supply comprises two power generators, for example associated to the induced voltage in the resonance circuit of the HF antenna-coil and to the induced voltage in the UHF antenna, a power management system is generally implemented in the integrated circuit.

Document US 2005/0186904 relates to a contactless integrated circuit comprising an RFID communication interface comprising an antenna coil for receiving a first induced HF alternating voltage when the integrated circuit is in the presence of an RF magnetic field, and a data processing unit linked to the first communication interface, the data processing unit being equipped with an electrically programmable and erasable memory. The integrated circuit further comprises a UHF communication interface comprising a UHF antenna for receiving a second induced alternating voltage when the integrated circuit is in the presence of a UHF electric field signal, and a multiplexing means for linking the data processing unit to one or other of the two communication interfaces. In particular, the integrated circuit also comprises a combined power and mode management system comprising a mode detection circuit (MDC) for detecting the presence of the alternating voltage at the terminals of the antenna coil, and a switch (SW).

With reference to FIG. 1, the mode detection unit senses an induced voltage in the HF resonance circuit and delivers a mode signal (DET). The mode signal (DET) indicates whether an HF electromagnetic field is received by the HF antenna-coil. In the case where an HF electromagnetic field is received by the HF antenna-coil, the switch (SW) is configured so that the integrated circuit is only powered by the HF part. In the case where an HF electromagnetic field is not received by the HF antenna-coil, the switch (SW) is configured so that the integrated circuit is only powered by the UHF part.

Document US 2016/0268850 discloses a dual frequency HF-UHF RFID integrated circuit comprising a power supply having a HF part, formed by a HF rectifier intended to be connected to a resonance circuit formed by a HF antenna-coil and a resonance capacitor, and a UHF part comprising a UHF rectifier formed by a charge pump and intended to be connected to a UHF antenna. The RFID integrated circuit further comprises a storage capacitor common to the HF and UHF parts of the power supply, the HF rectifier output and the UHF rectifier output being both continuously connected to the supply terminal of the common storage capacitor. The supply terminal of the common storage capacitor is connected to the output of the HF rectifier through a diode arranged so as to block a current from this supply terminal to the HF rectifier output.

Technical Problem

It is an object of the present invention to provide dual frequency HF-UHF RFID integrated circuits and dual frequency HF-UHF identification devices.

General Description

A first aspect of the invention pertains to a dual frequency HF-UHF RFID integrated circuit comprising a power supply. The power supply comprises an HF branch, a UHF branch and a supply line. The HF branch comprises an HF rectifier and a linear voltage regulator. The HF rectifier is configured to be connected to a resonance circuit formed by a HF antenna-coil and a resonance capacitor. In addition, the HF rectifier is connected to the linear voltage regulator. The UHF branch comprises a UHF rectifier and a shunt voltage regulator. The UHF rectifier comprises a charge pump and is configured to be connected to a UHF antenna. In addition, the UHF rectifier is connected to the shunt voltage regulator. The linear voltage regulator and the shunt voltage regulator are both connected to the supply line of the power supply.

A main advantage of the RFID integrated circuit according to the first aspect of the invention is that both incoming HF and UHF electromagnetic fields received by the HF resonance circuit and the UHF antenna can be used, possibly simultaneously, for supplying power to the integrated circuit.

It should be noted that the power supply of the RFID integrated circuit according to the first aspect of the invention allows for the integrated circuit to operate in several different powering scenarios without the use of involved electronic components, thereby reducing the cost of the integrated circuit and also reducing the overall power loss in the circuit. Such powering scenarios may comprise:

powering the dual frequency HF-UHF RFID integrated circuit (only) by HF electromagnetic fields received by the resonance circuit;

powering the dual frequency HF-UHF RFID integrated circuit (only) by UHF electromagnetic fields received by the UHF antenna; and powering the dual frequency HF-UHF RFID integrated circuit by HF and UHF electromagnetic fields received simultaneously by the resonance circuit and the UHF antenna, respectively.

In particular, it will be appreciated that the HF branch and the UHF branch are operating independently from each other in the sense that each branch comprises its own regulator, thereby decoupling the regulation of the HF and UHF branches. This is in stark contrast with the solution proposed by document US 2016/0268850 where a shunt voltage regulator is connected to the supply line. The shunt voltage regulator therefore has to regulate simultaneously the combined voltage of the HF and UHF branches. For example, in case of a strong HF field, the shunt voltage regulator has to dissipate a substantial amount of energy and therefore causes ripples or drops in the power supply line voltage. Such drawbacks are not present in the integrated circuit according to the first aspect of the present invention.

It will further be appreciated that the linear voltage regulator provides improved HF noise rejection, when compared to the device proposed in document US 2016/0268850.

Preferably, the HF branch and the UHF branch are both continuously connected to the supply line of the power supply. As used herein, "continuously connected" means that there is no selecting switch or other selecting means which selects the HF branch or the UHF branch as power generator for supplying power to the device when both HF and UHF branches receive at least useful induced voltages at their respective input terminals. In other terms, there is no switching means for giving priority to one of the HF and UHF branches and/or for avoiding that the other one of the HF and UHF branches supplies power to the device via the supply line.

According to one embodiment, the linear voltage regulator is a series linear voltage regulator. Preferably, the linear voltage regulator is a low-dropout series linear voltage regulator.

According to one embodiment, a first reference voltage is provided to the linear voltage regulator and a second reference voltage is provided to the shunt voltage regulator. Preferably, the linear voltage regulator and the shunt voltage regulator are provided with the same voltage reference. It will be appreciated that having the same voltage reference for the linear voltage regulator and the shunt voltage regulator allows for providing an accurate and stable supply line voltage.

According to one embodiment, a first output buffer capacitor is arranged at the output of the linear voltage regulator for stability purpose. For example, the first output buffer capacitor is lower than 50 pF.

According to one embodiment, a second output buffer capacitor is arranged at the output of the shunt voltage regulator for stability purpose. For example, the second output buffer capacitor is lower than 50 pF.

The HF branch may comprise an active diode arranged between the output of the linear voltage regulator and the supply line. The active diode prevents current leakage through the HF branch (from UHF branch). An active diode is an active switch having its gate controlled by the input or output of the switch.

The UHF branch may comprise an active diode arranged between the output of the shunt voltage regulator and the supply line. The active diode is configured to prevent current leakage through the UHF branch (from HF branch).

Reverse leakage currents through the respective branches are thereby reduced and the magnitude of fluctuations or ripples on the output signal of the respective branches is limited.

The active diodes may be the one described in document U.S. Pat. No. 10,043,124. Suitable active diodes provide a low drop voltage (for example, lower than 10 mV) in the ON state (i.e. a state where the input and the output of the active diode are electrically connected) and a high resistance in the OFF state (i.e. a state where the input and the output of the active diode are electrically disconnected).

It will be appreciated that the use of active diodes also allow for mitigating the voltage drop due to the diode, when compared to the disclosure of document US 2016/0268850, where the passive diode has a fixed voltage drop of around 0.5 to 1 Volt. A lower voltage drop across the active diodes allows for operating the integrated circuit with comparatively lower HF and/or UHF fields received by the HF antenna-coil and/or the UHF antenna.

The supply line may comprise a third output buffer capacitor. For example, the third output buffer capacitor belongs to an interval from 400 pF to 1 nF.

A second aspect of the invention relates to a dual frequency HF-UHF identification device. The dual frequency HF-UHF identification device comprises:
 a dual frequency HF-UHF RFID integrated circuit according to the first aspect of the invention;
 a resonance circuit formed by a HF antenna-coil and a resonance capacitor and connected to the HF rectifier; and
 a UHF antenna connected to the UHF rectifier.

BRIEF DESCRIPTION OF THE DRAWINGS

By way of example a, preferred, non-limiting embodiment of the invention will now be described in detail with reference to the accompanying drawing, in which:
 FIG. 1: is a schematic layout of the power supply of a dual frequency HF-UHF RFID integrated circuit according to the invention.

DETAILED DESCRIPTION OF A PREFERRED EMBODIMENT OF THE INVENTION

A preferred embodiment of the invention is described with reference to FIG. 1. FIG. 1 shows a power supply of a dual frequency HF-UHF identification device 10 comprising a RFID integrated circuit connected to an HF antenna coil 12 and to a UHF antenna 14. The power supply of the RFID circuit comprises a HF branch 16 and a UHF branch 18.

The HF branch 16 comprises a HF rectifier 20 connected to a resonance circuit formed by the HF antenna coil 12 and the resonance capacitor 22. The resonance circuit provides an induced alternating voltage to the input terminals $V_{1a}$ and $V_{1b}$ of the HF rectifier 20. The output of the HF rectifier 20 is connected to a terminal of a smoothing capacitor 24 and provides a first DC supply voltage $V_{HF}$. Alternatively or additionally, the HF rectifier 20 is associated to a voltage amplifying circuit for generating the first DC supply voltage $V_{HF}$.

The first DC supply voltage $V_{HF}$ is provided to the input terminal of a low-dropout series linear voltage regulator 25 for regulating the first DC supply voltage $V_{HF}$. The low-dropout series linear voltage regulator 25 allows for regulating the voltage $V_{HF}$ even when the desired regulated voltage $V_{HF,reg}$ is very close to $V_{HF}$. A first output buffer capacitor 26 is arranged at the output of the linear voltage regulator 25. The regulated voltage $V_{HF,reg}$ is provided to the input terminal of a first active diode 28. The first active diode 28 is configured so as to block a reverse current through the HF branch 16. It will be appreciated that the first active diode mitigates and/or suppresses voltage dropouts, when compared to passive diode such as a passive Schottky diode, and reverse current leakages (e.g. from the UHF branch 18).

The UHF branch 18 comprises a UHF rectifier 30, comprising a charge pump, linked to the two wires of the UHF antenna 14. The UHF rectifier 30 receives at its two input terminals $V_{2a}$ and $V_{2b}$ an AC induced voltage. The UHF rectifier 26 provides at its output a second DC supply voltage $V_{UHF}$.

The second DC supply voltage $V_{UHF}$ is provided to the input terminal of a shunt voltage regulator 32 to absorb a shunt current so as to regulate the second DC supply voltage $V_{UHF}$. The shunt voltage regulator 32 (providing the regulated voltage) is connected to the input terminal of a second active diode 34 through a second output buffer capacitor 36.

The second active diode 34 is configured so as to block a reverse current through the UHF branch 18. Like in the HF branch 16, the second active diode 34 mitigates and/or suppresses voltage dropouts, when compared to passive diode such as a passive Schottky diode, and reverse current leakages (e.g. from the HF branch 16).

It will further be appreciated that the use of low dropout components such as e.g. the first active diode 28, the second active diode 34 and/or the linear voltage regulator 25, allow for mitigating voltage drops across the integrated circuit, thereby efficiently managing HF and UHF the received HF and UHF electromagnetic fields. This is a significant advantage for powering the integrated circuit e.g. with ISO15693 compliant HF and/or UHF electromagnetic fields.

The reference input terminals of both the low-dropout series linear voltage regulator 25 and the shunt voltage regulator 32 are connected to the same reference voltage $V_{REF}$. It will be appreciated that providing the same reference voltage $V_{REF}$ allows for balancing the HF and UHF branches contribution for supplying power to the device. Alternatively, they may be connected to different reference voltages $V_{REF,HF}$, $V_{REF,UHF}$ for the HF and UHF branches, respectively.

Both the output terminal of the first active diode 28 and the second active diode 34 are continuously connected to a supply line 38 for supplying a supply voltage $V_{SUP}$ to the integrated circuit.

The supply line 34 comprises a third output buffer capacitor 40.

It will be appreciated that the power supply of the dual frequency HF-UHF RFID integrated circuit according to the first aspect of the invention is stable at least in the following operating conditions:

$V_{UHF} > V_{SUP}$ and $V_{HF,reg} < V_{SUP}$: (i.e. strong UHF field and weak or no HF field);

$V_{UHF} < V_{SUP}$ and $V_{HF,reg} > V_{SUP}$: (i.e. weak or no UHF field and strong HF field); and $V_{UHF} > V_{SUP}$ and $V_{HF,reg} > V_{SUP}$: (i.e. strong UHF field and strong HF field).

The power supply of a dual frequency HF-UHF RFID integrated circuit according to the invention, for instance the power supply of the preferred embodiment described hereinabove, can be implemented in diverse RFID integrated circuits and can be associated with other specific circuits arranged for controlling the power consumption of such circuits, in particular for minimizing their power consumption. In a case of a battery assisted HF-UHF identification device, the RFID integrated circuit can have a wake-up circuit associated with a listening mode. In a particular embodiment, the RFID integrated circuit comprises a HF field detector and/or a UHF field detector arranged for activating and/or controlling some parts the RFID integrated circuit. Further means for regulating the supply voltage $V_{SUP}$ and/or protecting some parts of the RFID integrated circuit as well as specific boosting means (in particular a voltage amplifier for further increasing the supply voltage) can be provided by a person skilled in the art.

While specific embodiments have been described herein in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A dual frequency HF-UHF RFID integrated circuit comprising a power supply, the power supply comprising:
   an HF branch comprising an HF rectifier and a linear voltage regulator, wherein the HF rectifier is configured to be connected to a resonance circuit formed by a HF antenna-coil and a resonance capacitor and wherein the HF rectifier is connected to the linear voltage regulator;
   a UHF branch comprising a UHF rectifier and a shunt voltage regulator, wherein the UHF rectifier comprises a charge pump and is configured to be connected to a UHF antenna and wherein the UHF rectifier is connected to the shunt voltage regulator; and
   a supply line;
   wherein the linear voltage regulator and the shunt voltage regulator are both connected to the supply line of the power supply.

2. The RFID integrated circuit according to claim 1, wherein the linear voltage regulator is a series linear voltage regulator.

3. The RFID integrated circuit according to claim 2, wherein the series linear voltage regulator is a low-dropout series linear voltage regulator.

4. The RFID integrated circuit according to claim 1, wherein a first reference voltage is provided to the linear voltage regulator and a second reference voltage is provided to the shunt voltage regulator.

5. The RFID integrated circuit according to claim 1, wherein the linear voltage regulator and the shunt voltage regulator are provided with the same voltage reference.

6. The RFID integrated circuit according to claim 1, further comprising an output buffer capacitor arranged at the output of the linear voltage regulator.

7. The RFID integrated circuit according to claim 1, further comprising an output buffer capacitor arranged at the output of the shunt voltage regulator.

8. The RFID integrated circuit according to claim 1, wherein the HF branch further comprises an active diode arranged between the output of the linear voltage regulator and the supply line.

9. The RFID integrated circuit according to claim 1, wherein the supply line comprises an output buffer capacitor.

10. The RFID integrated circuit according to claim 1, further comprising a first output buffer capacitor arranged at the output of the linear voltage regulator.

11. The RFID integrated circuit according to claim 10, further comprising a second output buffer capacitor arranged at the output of the shunt voltage regulator.

12. The RFID integrated circuit according to claim 11, wherein the HF branch further comprises an active diode arranged between the output of the linear voltage regulator and the supply line.

13. The RFID integrated circuit according to claim 12, wherein the UHF branch further comprises an active diode arranged between the output of the shunt voltage regulator and the supply line.

14. The RFID integrated circuit according to claim 13, wherein the supply line comprises a third output buffer capacitor.

15. A dual frequency HF-UHF RFID integrated circuit comprising a power supply, the power supply comprising:
   an HF branch comprising an HF rectifier and a linear voltage regulator, wherein the HF rectifier is configured to be connected to a resonance circuit formed by a HF antenna-coil and a resonance capacitor and wherein the HF rectifier is connected to the linear voltage regulator;

a UHF branch comprising a UHF rectifier and a shunt voltage regulator, wherein the UHF rectifier comprises a charge pump and is configured to be connected to a UHF antenna and wherein the UHF rectifier is connected to the shunt voltage regulator; and a supply line;

wherein the linear voltage regulator and the shunt voltage regulator are both connected to the supply line of the power supply, and the UHF branch further comprises an active diode arranged between the output of the shunt voltage regulator and the supply line.

16. A dual frequency HF-UHF identification device comprising:

a dual frequency HF-UHF RFID integrated circuit comprising a power supply, the power supply comprising:

an HF branch comprising an HF rectifier and a linear voltage regulator, wherein the HF rectifier is configured to be connected to a resonance circuit formed by a HF antenna-coil and a resonance capacitor and wherein the HF rectifier is connected to the linear voltage regulator;

a UHF branch comprising a UHF rectifier and a shunt voltage regulator, wherein the UHF rectifier comprises a charge pump and is configured to be connected to a UHF antenna and wherein the UHF rectifier is connected to the shunt voltage regulator; and a supply line;

a resonance circuit formed by a HF antenna-coil and a resonance capacitor and connected to said HF rectifier; and a UHF antenna connected to said UHF rectifier.

\* \* \* \* \*

UNITED STATES PATENT AND TRADEMARK OFFICE
CERTIFICATE OF CORRECTION

PATENT NO. : 11,321,599 B2
APPLICATION NO. : 16/834223
DATED : May 3, 2022
INVENTOR(S) : Thomas Coulot It is certified that error appears in the above-identified patent and that said Letters Patent is hereby corrected as shown below:

On the Title Page

Page 2, Column 1, Item (56) Foreign Patent Documents, Line 1; Delete "ER" and insert --EP-- therefor In the Drawings Sheet 1 of 1, Fig. 1; Insert --Fig. 1-- therefor Sheet 1 of 1, Fig. 1; Delete "V1a" and insert --$V_{1a}$-- therefor Sheet 1 of 1, Fig. 1; Delete "V1b" and insert --$V_{1b}$-- therefor Sheet 1 of 1, Fig. 1; Delete "V2a" and insert --$V_{2a}$-- therefor Sheet 1 of 1, Fig. 1; Delete "V2b" and insert --$V_{2b}$-- therefor In the Specification Column 4, Detailed Description of the Preferred Embodiments of the Invention, Line 60; Delete "26" and insert --30-- therefor Column 5, Detailed Description of the Preferred Embodiments of the Invention, Line 29; Delete "34" and insert --38-- therefor In the Claims Column 6, Line 18; In Claim 1, insert --supply, and the linear voltage regulator includes a feedback loop and is configured to maintain a constant output voltage by the linear voltage regulator having a varying resistance.-- therefor Signed and Sealed this
Twentieth Day of September, 2022

Katherine Kelly Vidal
*Director of the United States Patent and Trademark Office*

Column 8, Line 16; In Claim 16, delete "rectifier." and insert --rectifier, wherein the linear voltage regulator includes a feedback loop and is configured to maintain a constant output voltage by the linear voltage regulator having a varying resistance.-- therefor